United States Patent Office 3,377,341
Patented Apr. 9, 1968

3,377,341
1α-CYANO STEROIDS AND REACTION
PRODUCTS THEREFROM
Robert G. Christiansen, Schodack, N.Y., assignor to
Sterling Drug Inc., New York, N.Y., a corporation of Delaware
No Drawing. Filed Sept. 9, 1963, Ser. No. 307,341
30 Claims. (Cl. 260—239.55)

ABSTRACT OF THE DISCLOSURE

1α-cyano-3-oxo steroids of the androstane and pregnane series are prepared by the addition of the elements of hydrogen cyanide to 1,2-unsaturated 3-oxo steroids. The 1α-cyano-3-oxo steroids are in turn converted to 1-cyano-1,2-unsaturated 3-oxo steroids, 1α-aminomethyl steroids, 1α-acylaminomethyl steroids, 3α,1α-epoxymethano steroids, and 1α-lower-alkanoyl steroids. The compounds possess hormonal, hypocholesteremic and coronary dilator activities.

---

This invention relates to steroids, and in particular is concerned with 1α-cyano-3-oxo steroids of the androstane and pregnane series and with products derived therefrom.

A particular aspect of the invention is concerned with compounds of the formula

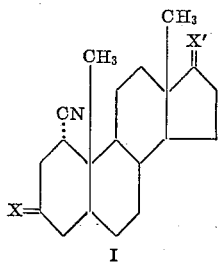

I wherein X stands for: O, (H)(OH), or (H)(OAcyl); and X' stands for:

O, (α—H)(β—OH), (α—H)(β—OAcyl),
(α-lower-alkyl)(β—OH), (α—H)(β—COCH₃), or
(α—H)(β—CH(OH)CH₃)

Acyl in each instance being a carboxylic acyl group of from one to about ten carbon atoms and having a molecular weight less than about 200. Also contemplated are the corresponding compounds having a double bond in the 4,5-position, X being O (II), and the corresponding compounds having two double bonds, one in the 4,5-position and the other in the 6,7-position, X being O (III):

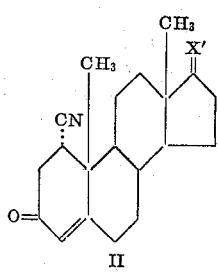

II

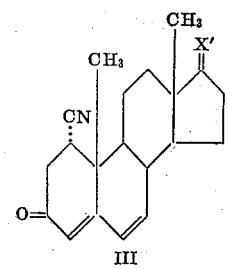

III

Representative of the acyl radicals (Acyl) which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, β-phenylpropionyl, cinnamoyl, and the like; and monocarbocyclic aryloxy-lower-alkanoyl radicals, such as p-chlorophenoxyacetyl, and the like.

When X' stands for (α-lower-alkyl)(β—OH) in the above definitions, "lower-alkyl" means an alkyl group having from 1 to about 4 carbon atoms and thus includes methyl, ethyl, propyl, isopropyl, butyl and the like.

The compounds of Formula I can belong to either the 5α-series (A/B trans) or 5β-series (A/B-cis).

Compounds of the above Formulas I, II and III are prepared by the addition of the elements of hydrogen cyanide to corresponding 3-oxo steroids containing a double bond in the 1,2-position. Said starting materials are of the formula:

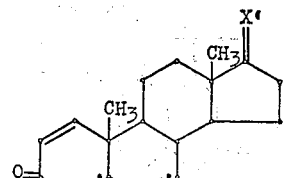

IV wherein X' has the same meaning given above. The reaction is effected by treating a compound of Formula IV with approximately one molar equivalent of an ionizable metallic cyanide, e.g. an alkali metal cyanide, in an aqueous-organic medium. In the event the starting material also has a double bond in the 4,5-position, or double bonds in both the 4,5- and 6,7-positions, addition to the 1,2-double bond occurs preferentially, and compounds of Formulas II or III, respectively, are produced.

Compounds of Formula I (X being O, 5β-series) can also be prepared by catalytic reduction of compounds of Formulas II and III using palladium hydroxide on strontium carbonate as the catalyst. Under these conditions the nuclear double bonds are reduced without affecting the 1-cyano group or oxo groups at the 3- or 17-positions.

Compounds of Formula II can also be prepared from compounds of Formula I (X being O, X' being other than O, 5β-series) by bromination with elementary bromine to produce a 4-bromo derivative, followed by dehydrobromination to introduce the 4,5-double bond. The dehydrobromination is effected by heating the 4-bromo derivative with a high-boiling tertiary amine such as collidine, or with a lithium halide lithium carbonate mixture.

Generally speaking, if the bromination-dehydrobromination is carried out on compounds of Formula I (X being O, X' being other than O, 5α-series), a double bond is introduced into the 1,2-position to give a compound of Formula V:

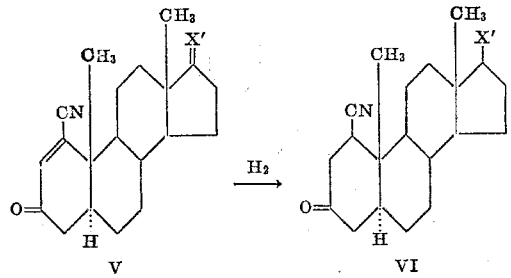

Catalytic hydrogenation of a compound of Formula V gives a 1-cyano-3-oxo steroid which is different from the 1-cyano-3-oxo steroid originally brominated. Since conformation analysis would predict that the catalytic hydrogenation of the Δ¹-steroid would produce a 1β-cyano steroid of Formula VI, it follows that the initial 1-cyano-3-oxo steroid of Formula I had the cyano group in the α-position.

In some instances where steroids of the 5α-series are involved, bromination occurs in the 4-position as well as in the 2-position, thus leading, after dehydrobromination to a mixture of a 4,5-unsaturated steroid of Formula II and a 1,2-unsaturated steroid of Formula V.

The invention also includes compounds wherein the 1α-cyano group has been converted to other functional groups.

Catalytic reduction of compounds of Formula I using platinum oxide as a catalyst produces 1α-aminomethyl compounds of the Formula VII:

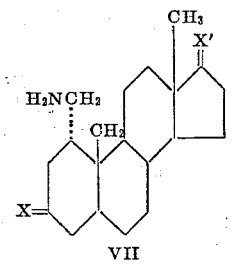

wherein X is (H)(OH) or (H)(OAcyl) of either configuration, and X' is (α-H)(β-OH), (α-H)(β-OAcyl), (a-lower-alkyl)(β-OH), or (α-H)(β-CH(OH)CH₃). Any oxo groups in the starting material are reduced to hydroxy groups. The 1α-aminomethyl compounds can be acylated by conventional procedures to produce 1α-lower-alkanoylaminomethyl compounds of Formula VIII:

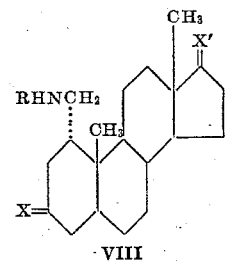

wherein R is lower-alkonyl, preferably having from one to about six carbon atoms, thus including formyl, acetyl, propionyl, butyryl, isobutyryl, valeryl, caproyl and the like.

The 1α-aminomethyl compounds of Formula VII can in turn be treated with nitrous acid to replace the amino group by hydroxy. In the case where X stands for (H)(α-OH) or (H)(α-OAcyl), the corresponding 1α-hydroxymethyl compound is not isolated because it undergoes simultaneous cyclodehydration to give a 3α,1α-epoxymethano compound of Formula IX:

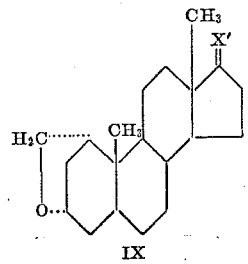

wherein X' is (α-H)(β-OH), (α-H)(β-OAcy), (α-lower-alkyl)(β-OH), or (α-H)(β-CH(OH)CH₃). The compounds where X' is O or (α-H)(β-COCH₃) can be produced from the compounds where X' is (α-H)(β-OH) or (α-H)(β-CH(OH)CH₃), respectively by conventional oxidation reactions, as with chromic oxide or by the Oppenauer method.

The formation of the epoxymethano ring constitutes proof that the substituent in the 1-position is in the α-configuration.

A further transformation of the 1α-cyano group is brought about by causing a compound of Formula I to react with a lower-alkylmagnesium halide, thus producing a 1α-lower-alkanoyl compound of the Formula X:

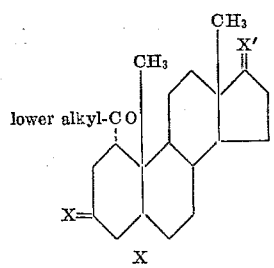

The lower-alkyl groups have from one to about six carbon atoms and thus include such groups as methyl, ethyl, propyl, isopropyl, butyl, pentyl, hexyl and the like. In the event the groups X and X' represent or contain carbonyl groups, the latter can be protected against reaction with the Grignard reagent by converting them to ketal derivatives.

The structures of the compounds of the invention were established by the modes of preparation, by elementary analysis, and by chemical and physical properties, including ultraviolet and infrared spectra.

Biological evaluation of the products of the invention have shown that they possess endocrinological and pharmacological properties, for example, androgenic, anabolic, estrogenic, pituitary inhibitory, hypocholesteremic and coronary dilator activities.

The following examples will further illustrate the invention without limiting the latter thereto.

Example 1.—1α-cyano-4,6-androstadien-17β-ol-3-one 17-acetate [III; X' is (α-H)(β-OCOCH₃)]

A mixture of 6.52 g. of 1,4,6-androstatrien-17β-ol-3-one 17-acetate, 1.43 g. of potassium cyanide, 100 ml. of methanol, 10 ml. of ethyl acetate and 10 ml. of water was refluxed for four hours. At the end of this time most of the solvent was removed by distillation and water was added to the residue. The mixture was extracted with methylene dichloride and the extracts were dried over anhydrous magnesium sulfate and concentrated in vacuo. To the residue was added 10 ml. of pyridine and 10 ml.

of acetic anhydride, and after three days at room temperature the mixture was added to 1 liter of water and extracted with ethyl acetate. The extracts were washed successively with 10% hydrochloric acid, 5% sodium bicarbonate solution, water and saturated sodium chloride solution, dried over anhydrous magnesium sulfate and concentrated in vacuo. The residue was dissolved in pentane containing 20% ether and chromatographed on a column of 100 g. of silica gel. The column was eluted with ether-methylene dichloride-pentane mixtures of the following proportions: 4:2:14; 5:2:13; 6:2:12; and 7:2:11. The last eluant brought out the desired product which was recrystallized from methanol to give 1α-cyano-4,6-androstadien-17β-ol-3-one 17-acetate in the form of colorless prisms, M.P. 198.8–201.2° C. (corr.), $[\alpha]_D^{25}$= +49.3° (1% in chloroform); ultraviolet maximum at 285 mμ ($\epsilon$=27,200); infrared absorption at 4.46, 5.77, 6.03, 6.19, 6.32 and 8.04μ.

Example 2.—1α-cyano-4,6-androstadien-17β-ol-3-one [III; X' is (α-H)(β-OH)]

A mixture of 7.06 g. of 1α-cyano-4,6-androstadien-17β-ol-3-one 17-acetate (Example 1), 10.0 g. of potassium bicarbonate, 200 ml. of methanol and 50 ml. of water was refluxed for two hours. The solvent was removed by evaporation at reduced pressure, water was added to the residue and the solid product collected by filtration. The latter was recrystallized from ethyl acetate to give 1α - cyano - 4,6-androstadien-17β-ol-3-one, M.P. 172–174° C. (uncorr.); ultraviolet maximum at 287 mμ ($\epsilon$=26,100); infrared absorption at 2.93, 3.45, 4.48, 6.07, 6.18 and 6.35μ.

Example 3.—1α-cyano-4,6-androstadiene-3,17-dione [III; X' is O]

A solution of 1.71 g. of chromic oxide in 2 ml. of water and 8 ml. of acetic acid was added to a solution of 5.35 g. of 1α-cyano-4,6-androstadien-17β-ol-3-one (Example 2) in 25 ml. of acetic acid. The reaction mixture was cooled in an ice bath and allowed to stand for two hours. Methanol (5 ml.) was then added and after two hours the mixture was poured into 1 liter of water and allowed to stand overnight. The solid product was collected by filtration and recrystallized once from ethyl acetate and three times from 95% ethanol to give 1α-cyano-4,6-androstadiene-3,17-dione in the form of colorless needles, M.P. 250.6–254.4° C. (corr.), $[\alpha]_D^{25}$=+ 142.0° (1% in chloroform); ultraviolet maximum at 285 mμ ($\epsilon$=25,400); infrared absorption at 3.42, 3.50, 4.48, 5.78, 5.97, 6.19 and 6.31μ.

1α-cyano-4,6-androstadiene-3,17-dione was also prepared by causing 1,4,6-androstatriene-3,17-dione to react with potassium cyanide according to the manipulative procedure described above in Example 1. The product thus obtained had the M.P. 251–253° C. (uncorr.).

Example 4.—1α-cyano-5β-androstan-17β-ol-3-one 17-acetate [I; X is O, X' is (α-H)(β-OCOCH₃), 5β-series]

A solution of 6.57 g. of 1α-cyano-4,6-androstadien-17β-ol-3-one 17-acetate (Example 1) in 300 ml. of ethanol was hydrogenated in the presence of 2.1 g. of 2% palladium hydroxide on strontium carbonate catalyst until 2 moles of hydrogen had been absorbed. The reaction mixture was filtered to remove the catalyst and the filtrate was concentrated in vacuo. The residue was dissolved in ethyl acetate, washed with water and with saturated sodium chloride solution, dried over anhydrous magnesium sulfate and concentrated. The product was recrystallized several times from ethyl acetate to give 1α-cyano-5β-androstan-17β-ol-3-one 17-acetate in the form of colorless prisms, M.P. 202.4–205.2° C. (corr.), $[\alpha]_D^{24}$=−14.8° (1% in chloroform); infrared absorption at 3.44, 4.48, 5.79, 5.81 and 6.89μ.

Example 5.—(a) 1α-cyano-4-bromo-5β-androstan-17β-ol-3-one 17-acetate

A solution of 2.70 g. of bromine in 25 ml. of acetic acid was added to a solution of 6.05 g. of 1α-cyano-5β-androstan-17β-ol-3-one 17-acetate (Example 4) in 15 ml. of acetic acid to which had been added 2 drops of 30% hydrogen bromide in acetic acid. The bromine color instantly disappeared and the reaction mixture was poured into 800 ml. of water. The solid product was collected by filtration and dried to give 7.32 g. of 1α-cyano-4-bromo-5β-androstan-17β-ol-3-one 17-acetate, M.P. 165–171° C. (dec.) (uncorr.).

(b) 1α-cyano-4-androsten-17β-ol-3-one 17-acetate [II; X' is (α-H)(β-OCOCH₃)]

A mixture of 7.32 g. of 1α-cyano-4-bromo-5β-androstan-17β-ol-3-one 17-acetate, obtained in part (a) above, and 50 ml. of collidine was heated at reflux for one-half hour. The reaction mixture was cooled, diluted with 50 ml. of ether and washed with 2 N sulfuric acid and with water. At this point there separated some solid material which was collected by filtration (2.35 g., M.P. 190–196° C.). Ethyl acetate was added to the filtrate and the solution was washed with water and saturated sodium chloride solution, dried over anhydrous magnesium sulfate and concentrated to dryness. The residue was combined with the solid product obtained earlier and recrystallized three times from methanol to give 1α-cyano-4-androsten-17β-ol-3-one 17-acetate in the form of colorless needles, M.P. 198.6–201.6° C. (corr.), $[\alpha]_D^{25}$=+103.3° (1% in chloroform); ultraviolet maximum at 240 mμ ($\epsilon$=16,100); infrared absorption at 3.43, 4.47, 5.77, 5.98, 6.91 and 6.96μ.

1α-cyano-4-androsten-17β-ol-3-one 17-acetate can be saponified by heating it with a mixture of potassium bicarbonate in methanol solution according to the procedure described above in Example 2, to obtain 1α-cyano-4-androsten-17β-ol-3-one. The latter can be caused to react with propionic anhydride, caproyl chloride, succinic anhydride, β-cyclopentylpropionic anhydride, benzoyl chloride, p-nitrobenzoyl chloride or cinnamoyl chloride, in the presence of pyridine, to give, respectively, the 17-propionate, 17-caproate, 17-hemisuccinate, 17-(β-cyclopentylpropionate), 17-benzoate, 17-(p-nitrobenzoate) or 17-cinnamate of 1α-cyano-4-androsten-17β-ol-3-one.

Example 6

1α-cyano-5β-androstane-3,17-dione [I; X is O, X' is O, 5β-series] was prepared by hydrogenation of 6.18 g. of 1α-cyano-4,6-androstadiene-3,17-dione (Example 3) in the presence of 2.0 g. of palladium hydroxide on strontium carbonate catalyst according to the manipulative procedure described above in Example 4. The product thus obtained was recrystallized from ethyl acetate to give 1α-cyano-5β-androstane-3,17-dione in the form of colorless needles, M.P. 216.4–220.6° C. (corr.), $[\alpha]_D^{25}$=+55.4° (1% in chloroform); ultraviolet maximum at 295 mμ ($\epsilon$=50); infrared absorption at 3.42, 4.48, 5.74 and 5.81μ.

Example 7

1α-cyano-5α-androstan-17β-ol-3-one 17-acetate [I; X is O, X' is (α-H)(β-OCOCH₃), 5α-series] was prepared from 50.45 g. of 1-androsten-17β-ol-3-one 17-acetate and 10.40 g. of potassium cyanide in a methanol-ethyl acetate-water mixture according to the manipulative procedure described above in Example 1. The product was acetylated with acetic acid in pyridine and chromatographed on a column of silica gel. The column was eluted with ether-methylene dichloride-pentane 4:1:5, and the product was recrystallized from methanol to give 1α-cyano-5α-androstan-17β-ol-3-one 17-acetate in the form of colorless needles, M.P. 174.8–175.8° C. (corr.), $[\alpha]_D^{25}$=+43.4° (1% in chloroform); infrared absorption at 3.46, 4.49, 5.81 and 8.02μ.

The 3-ethylene glycol ketal of 1α-cyano-5α-androstan-17β-ol-3-one 17-acetate was prepared by heating at reflux under a water separator for sixteen hours 17.00 g. of 1α-cyano-androstan-17β-ol-3-one 17-acetate, 68 ml. of ethylene glycol and 1.00 g. of p-toluenesulfonic acid in 700 ml. of benzene. The ketal had the M.P. 188.5–191° C. (uncorr.).

The enol acetate of 1α-cyano-5α-androstan-17β-ol-3-one 17-acetate was prepared by heating 1α-cyano-5α-androstan-17β-ol-3one 17-acetate with acetic anhydride in pyridine for two hours on a steam bath. The product was isolated and recrystallized from methanol to give 1α-cyano-5α-2-androstene-3,17β-diol 3,17-diacetate in the form of cololress prisms M. P. 189.2–191.0° (corr.), $[\alpha]_D^{25}=+136.60$; infrared absorption at 3.41, 4.47, 5.67, 5.76, 5.87, 6.94, 7.97 and 8.20μ.

Example 8.—1-cyano-5α-1-androsten-17β-ol-3-one 17-acetate

1α-cyano-5α-androstan-17β-ol-3-one 17-acetate was brominated and dehydrobrominated according to the procedure described above in Example 5. The product was chromatographed on 300 g. of silica gel and eluated with ether-methylene dichloride-pentane 4:1:5. The first product eluted was collected and recrystallized three times from ethyl acetate to give 1-cyano-5α-1-androsten-17β-ol-3-one 17-acetate in the form of yellow leaflets, M.P. 216.8–218.4° C. (corr.), $[\alpha]_D^{25}=+5.8°$ (1% in chloroform); ultraviolet maximum at 238 mμ ($\epsilon=10,800$); infrared absorption at 4.52, 5.74, 5.91, 6.36 and 8.08μ.

The second product eluted was recrystallized from methanol, had the M.P. 197–199° C. (uncorr.) and proved to be identical with the 1α-cyano-4-androsten-17β-ol-3-one 17-acetate obtained above in Example 5(b).

Example 9.—1β-cyano-5α-androstan-17β-ol-3-one 17-acetate

A solution of 2.50 g. of 1-cyano-5α-1-androsten-17β-ol-3-one 17-acetate (Example 8) in 300 ml. of ethyl acetate was hydrogenated in the presence of 1.00 g. of 10% palladium on carbon catalyst. The product was isolated and recrystallized three times from ethyl acetate to give 1β-cyano-5α-androstan-17β-ol-3-one 17-acetate in the form of colorless rods, M.P. 213.4–214.4° C. (corr.), $[\alpha]_D^{25}=+1.2°$ (1% in chloroform); infrared absorption at 4.47 and 5.77μ.

1β-cyano-5α-androstan-17β-ol-3-one 17-acetate can be saponified by heating it with a methanol solution of potassium bicarbonate according to the manipulative procedure described above in Example 2 to give 1β-cyano-5α-androstan-17β-ol-3-one. The latter can be caused to react with propionic anhydride, caproyl chloride, succinic anhydride, β-cyclopentylpropionic anhydride, benzoyl chloride, p-nitrobenzoyl chloride or cinnamoyl chloride in the presence of pyridine to give, respectively, the 17-propionate, 17-caproate, 17-hemisuccinate, 17-(β-cyclopentylpropionate), 17-benzoate, 17-(p-nitrobenzoate) or 17-cinnamate of 1β-cyano-5α-androstan-17β-ol-3-one.

Example 10

1α-cyano-17α-methyl-5α-androstan-17β-ol-3-one [I; X is O, X' is (α-CH₃) (β-OH), 5α-series] was prepared from 28.68 g. of 17α-methyl-5α-1-androstan-17β-ol-3-one and 6.51 g. of potassium cyanide according to the procedure described above in Example 1. The crude product was chromatographed on 1500 g. of silica gel, and the column was eluted with ether-methylene dichloride 9:1. The material having the M.P. 205–212° C. was combined and recrystallized four times from ethanol to give 1α-cyano-17α-methyl-5α-androstan-17β-ol-3-one in the form of colorless needles, M.P. 202.8–209.2° C. (corr.), $[\alpha]_D^{25}=+29.7°$ (1% in chloroform); infrared absorption at 2.90, 3.43, 4.47 and 5.80–5.85μ.

The 3-oxime of 1α-cyano-17α-methyl-5α-androstan-17β-ol-3-one was prepared as follows: a mixture of 13.18 g. of 1α-cyano-17α-methyl - 5α-androstan - 17β-ol-3-one, 12.16 g. of hydroxylamine hydrochloride, 40 ml. of pyridine and 200 ml. of ethanol was heated at reflux for two hours. The reaction mixture was concentrated in vacuo, 500 ml. of water was added, and the product was collected by filtration, dried and recrystallized from methanol to give the oxime in the form of colorless needles, M.P. 260.2–268.2° C. (corr.), $[\alpha]_D^{25}=+48.1°$ (1% in chloroform).

Example 11

1α-cyano-5α-pregnane-3,20-dione [I; X is O, X' is (α-H) (β-COCH₃), 5α-series] was prepared from 16.04 g. of 5α-1-pregnene-3,20-dione and 3.52 g. of potassium cyanide according to the procedure described above in Example 1. The product was collected and recrystallized three times from methyl ethyl ketone to give 1α-cyano-5α-pregnane-3,20-dione in the form of colorless prisms, M.P. 242.8–244.2° C. (corr.), $[\alpha]_D^{25}=+140.2°$ (1% in chloroform); infrared absorption at 3.45, 4.49, 5.82 and 5.91μ.

The 3,20-bis-ethylene glycol ketal of 1α-cyano-5α-pregnane-3,20-dione (prepared from 1α-cyano-5α-pregnane-3,20-dione and ethylene glycol in the presence of p-toluenesulfonic acid) had the M.P. 147–150° C. (uncorr.) when recrystallized from methanol.

By the procedure described above in Example 1, 5α-1-pregnen-20-ol-3-one can be caused to react with potassium cyanide to give 1α-cyano-5α-pregnan-20-ol-3-one [I; X is O, X' is (α-H)(β-CHOHCH₃), 5α-series].

Example 12.—1α-cyano-4-pregnene-3,20-dione [II; X' is (α-H)(β-COCH₃)]

To a solution of 17.09 g. of 1α-cyano-5α-pregnane-3,20-dione (Example 11) in 200 ml. of methylene dichloride containing 6 drops of 30% hydrogen bromide in acetic acid was added a solution of 8.00 g. of bromine in acetic acid. The crude bromo compound was isolated and there was then added 200 ml. of dimethylformamide, 17.5 g. of lithium carbonate and 15.6 g. of lithium bromide. The mixture was heated for twenty hours with stirring, diluted with 4 liters of water and filtered. The filtrate was extracted with two 500 ml. portions of methylene dichloride, and the methylene dichloride extracts were washed with 500 ml. of water, dried over anhydrous magnesium sulfate and concentrated. The residue was chromatographed on 1000 g. of silica gel, and the column was eluted with ether-methylene dichloride-pentane mixture starting with proportion 2:1:7 and gradually increasing the proportion of ether while decreasing the proportion of pentane. The mixture ratio 7:1:2 brought out the desired product which was recrystallized four times from methanol to give 1α-cyano-4-pregnene-3,20-dione in the form of colorless needles, M.P. 191.6–192.8° C. (corr.), $[\alpha]_D^{25}=+205.4°$ (1% in chloroform); ultraviolet maximum at 240 mμ ($\epsilon=17,800$); infrared absorption at 4.49, 5.86, 5.99 and 6.21μ.

Example 13.—1α-cyano - 5β - androstane-3α,17β-diol 17-acetate [I; X is (H)(α-OH), X' is (α-H)(β-OCOCH₃), 5β-series]

To a solution of 18.00 g. of 1α-cyano-5β-androstan-17β-ol-3-one 17-acetate (Example 4) in 200 ml. of tetrahydrofuran, 100 ml. of ethyl acetate and 1000 ml. of ethanol was added a solution of 7.56 g. of sodium borohydride in 100 ml. of water. The reaction mixture was allowed to stand for one hour in an ice bath and then for one hour at room temperature. Acetic acid (30 ml.) was added, and the mixture was concentrated by distillation in vacuo. Water (1000 ml.) was added to the residue, and the solid product was collected and dried to give 17.34 g. of 1α-cyano-5β-androstane-3α,17β-diol 17-acetate, M.P. 215.2–217.8° C. (corr.), colorless needles from methanol, $[\alpha]_D^{25}=-10.1°$ (1% in chloroform); infrared absorption at 2.87, 3.46, 4.49, 5.84 and 7.97μ.

1α-cyano-5β-androstane-3α,17β-diol 17-acetate can be caused to react with acetic anhydride, propionic anhydride, caproyl chloride, succinic anhydride, β-cyclopentylpropionic anhydride, benzoyl chloride, p-nitrobenzoyl chloride, or cinnamoyl chloride in the presence of pyridine to give, respectively, the 3-acetate, 3-propionate, 3 - caproate, 3 - hemisuccinate, 3 - (β-cyclopentylpropionate), 3-benzoate, 3-(p-nitrobenzoate), or 3-cinnamate of 1α-cyano-5β-androstane-3α,17β-diol 17-acetate.

Example 14

1α-cyano-5α-androstan-17β-ol-3-one 17-acetate (Example 7) (18.00 g.) was reduced with 7.56 g. of sodium borohydride according to the procedure described above in Example 13. The crude product was acetylated by heating it for two hours on a steam bath with 40 ml. of acetic anhydride and 80 ml. of pyridine, and the acetylated product was chromatographed on 1000 g. of silica gel. The column was eluted with ether-methylene dichloride-pentane mixtures of proportion 3:1:6 and 4:1:5. A lower melting product was eluted first and recrystallized twice from methanol to give 1α-cyano-5α-androstane-3β,17β-diol 3,17-diacetate [I; X and X' are (α-H) (β-OCOCH₃), 5α-series], in the form of colorless prisms, M.P. 166.4–167.4° C. (corr.), $[\alpha]_D^{25}=+13.5°$ (1% in chloroform); infrared absorption at 4.50, 5.77 and 8.05μ.

A higher melting product was eluted last and recrystallized twice from methanol to give 1α-cyano-5α-androstane - 3α,17β - diol 3,17 - diacetate [I; X is (β-H) (α-OCOCH₃), X' is (α-H) (β-OCOCH₃), 5α-series] in the form of colorless prisms, M.P. 210.2–211.0° C. (corr.), $[\alpha]_D^{25}=+24.7°$ (1% in chloroform); infrared absorption at 4.50, 5.77 and 8.05μ.

By a similar procedure, 1α-cyano-17α-methyl-5α-androstan-17β-ol-3-one (Example 10) can be reduced with sodium borohydride to give 1α-cyano-17α-methyl-5α-androstane-3β,17β-diol [II; X is (α-H) (β-OH), X' is (α-CH₃) (β-OH), 5α-series] and 1α-cyano-17α-methyl-5α-androstane-3α,17β-diol [I; X is (β-H) (α-OH), X' is (α-CH₃) (β-OH), 5α-series].

Example 15. — 1α - formamidomethyl - 5β-androstane-3α,17β-diol 3-formate 17-acetate [VIII; R is HCO, X is (H) (α-OCOH), X' is (α-H) (β-OCOCH₃), 5β-series]

A mixture of 8 g. of 1α-cyano-5β-androstane-3α,17β-diol 17-acetate (Example 13), 30 ml. of water and 270 ml. of acetic acid was hydrogenated at room temperature in the presence of 2.0 g. of platinum oxide catalyst. The catalyst was removed by filtration and the filtrate concentrated in vacuo. To the residue was added 1000 ml. of water, the mixture was filtered and the filtrate made basic. The resulting gelatinous precipitate was extracted with methylene dichloride, and the methylene dichloride extracts were washed with water, dried over anhydrous magnesium sulfate and concentrated in vacuo. The residue of 1α-aminomethyl-5β-androstane-3α,17β-diol 17-acetate was stirred with 40.8 ml. of acetic anhydride and 17.2 ml. of formic acid for two hours at 50–60° C. and overnight at 90° C. The reaction mixture was cooled, poured into 1 liter of water and extracted with methylene dichloride and with ether. The combined extracts were washed with water, sodium bicarbonate solution, again with water, dried over anhydrous magnesium sulfate and concentrated in vacuo. The residue was chromatographed on 550 g. of silica gel, and the column was eluted first with ether-methylene dichloride-pentane, then with ether-methylene dichloride and finally with ether-acetone. The last eluant brought out the desired product which was recrystallized twice from ethyl acetate to give 1α-formamidomethyl-5β-androstane-3α,17β-diol 3-formate 17-acetate in the form of colorless prisms, M.P. 191.8–192.6° C. (corr.), $[\alpha]_D^{25}=+29.6°$ (1% in chloroform); infrared absorption at 3.07, 3.45, 5.75, 5.80, 6.04, 8.03, 8.36 and 8.44μ.

Example 16.—1α-aminomethyl-5β-androstane-3α,17β-diol 3,17-diacetate [VIII; R is H, X is (H) (α-OCOCH₃), X' is (α-H) (β-OCOCH₃), 5β-series]

1α-cyano-5β-androstane-3α,17β-diol 3,17-diacetate [10.0 g., colorless needles, M.P. 137–141° C. (uncorr.), prepared from 1α-cyano-5β-androstane-3α,17β-diol 17-acetate (Example 13) and acetic anhydride in pyridine] was dissolved in 300 ml. of acetic acid and hydrogenated at room temperature in the presence of 2.0 g. of platinum oxide catalyst. The product was isolated and recrystallized from a methylene dichloride-ether mixture to give 1α-aminomethyl-5β-androstane-3α,17β-diol 3,17-diacetate in the form of its acetate salt, M.P. 205.2–260.4° C. (corr.), $[\alpha]_D^{25}=+34.5°$ (1% in chloroform).

1α - aminomethyl - 5β-androstane-3α,17β-diol 3,17-diacetate can be caused to react with acetic anhydride, butyric anhydride or caproic anhydride, in the presence of a trace of sulfuric acid, to give, respectively, 1α-acetylaminomethyl - 5β - androstane-3α,17β-diol 3,17-diacetate [VIII; R is CH₃CO, X is (H) (α-OCOCH₃), X' is (α-H) (β-OCOCH₃), 5β - series]; 1α - butyrylaminomethyl-5β-androstane - 3α,17β - diol 3,17 - diacetate [VIII; R is CH₃(CH₂)₂CO, X is (H) (α-OCOCH₃), X' is (α-H) (β-OCOCH₃), 5β-series]; or 1α-caproylaminomethyl-5β-androstane-3α,17β-diol 3,17-diacetate [VIII; R is

$CH_3(CH_2)_4CO$

X is (H) (α-OCOCH₃), X' is (α-H) (β-OCOCH₃), 5β-series].

1α - aminomethyl - 5β - androstane-3α,17β-diol 3,17-diacetate can be saponified with potassium bicarbonate in methanol according to the procedure described above in Example 2 to give 1α-aminomethyl-5β-androstane-3α,17β-diol [VIII; R is H, X is (H) (α-OH), X' is (α-H) (β-OH), 5α-series].

1α - cyano - 17α-methyl-5α-androstane-3α,17β-diol can similarly be hydrogenated to give 1α-aminomethyl-17α-methyl-5α-androstane-3α,17β-diol [VIII; R is H, X is (β-H) (α-OH), X' is (α-CH₃) (β-OH), 5α-series].

Example 17

(a) 1α-aminomethyl-5α-androstane-3α,17β-diol 3,17-diacetate was prepared by hydrogenation of 10.03 g. of 1α-cyano-5α-androstane-3α,17β-diol 3,17-diacetate (Example 14) in the presence of platinum oxide catalyst according to the procedure described above in Example 15. The produce was not purified and was used directly in the following procedure.

(b) 3α,1α - epoxymethano-5α-androstan-17β-ol 17-acetate [IX; X' is (α-H) (β-OCOCH₃), 5α-series].—A product from part (a) above was dissolved in 500 ml. of water and 10 ml. of acetic acid, and to this solution was added during five minutes a solution of 6.9 g. of sodium nitrite in 100 ml. of water. The reaction mixture was extracted with methylene dichloride and the extracts were washed with sodium bicarbonate solution, dried over anhydrous magnesium sulfate and concentrated in vacuo. The residue was chromatographed on 1000 g. of silica gel and the column was eluted with ether-pentane 1:1. There was thus obtained 6.58 g. of product which was recrystallized three times from acetonitrile to give 3α,1α-epoxymethano-5α-androstan - 17β - ol 17-acetate, M.P. 105.4–107.4° C. (corr.), $[\alpha]_D^{25}+=34.3°$ (1% in chloroform); infrared absorption at 3.46; 5.78, 5.82, 6.93 and 8.02–8.07μ.

(c) 3α,1α-epoxymethano-5α-androstan-17β-ol [IX, X' is (α-H)(β-OH), 5α-series] was prepared by refluxing for one hour a mixture of 4.75 g. of 3α,1α-epoxymethano-5α-androstan-17β-ol acetate, 190 g. of 85% potassium hydroxide, 100 ml. of methanol and 10 ml. of water.

3α,1α-epoxymethano-5α-androstan-17-one [IX; X' is O, 5α-series] can be prepared by chromic acid oxidation of 3α,1α-epoxymethano-5α-androstan-17β-ol according to the procedure described above in Example 3.

According to the procedure described above in part (b) 1α-aminomethyl-17α-methyl-5α-androstane - 3α,17β - diol can be converted to 3α,1α-epoxymethano-17α-methyl-5α-androstan-17β-ol [IX; X' is (α-CH₃)(β-OH), 5α-series].

Example 18

(a) 1α-aminomethyl-5α-pregnane-3α,20 - diol [VIII; R is H, X is (β-H)(α-OH), X' is (α-H)(β-CHOHCH₃), 5α-series].—1α-cyano-5-pregnane-3,20 - dione (Example 11) (6.83 g.) was dissolved in 300 ml. of acetic acid and hydrogenated at room temperature in the presence of 2.00 g. of platinum oxide catalyst. The catalyst was removed by filtration and the solvent was removed from the filtrate by distillation. The residue was dissolved in 500 ml. of water and the resulting solution of the acetate salt of 1α-aminoethyl-5α-pregnane-3α,20-diol was used directly in the next reaction.

(b) 3α,1α-epoxymethano-5α-pregnan-20-ol [IX; X' is (α-H)(β-CHOHCH₃), 5α-series].—To the solution from part (a) was added dropwise a solution of 6.9 of sodium nitrite in 100 ml. of water. The solid product which separated was collected by filtration and dissolves in 200 ml. of methylene dichloride. The methylene dichloride solution was washed with 5% sodium bicarbonate solution, dried over anhydrous magnesium sulfate and concentrated in vacuo. The residue of 3α,1α-epoxymethano-5α-pregnan-20-ol was used directly in the next reaction.

(c) 3α,1α-epoxymethano-5α-pregnan-20-one [IX; X' is O, 5α-series].—A solution of the crude product from part (b) in 250 ml. of toluene in 180 ml. of cyclohexane was distilled until 50 ml. of distillate was collected. The remaining mixture was cooled and a solution of 10.2 g. of aluminum isopropoxide in 100 ml. of toluene was added. The reaction mixture was refluxed for two hours, then cooled and 200 ml. of 2 N sulfuric acid added. The toluene layer was separated and washed with 200 ml. of 2 N sulfuric acid and with water. The toluene solution was steam distilled until 4 liters of distillate was collected. The residue was extracted with methylene dichloride, dried over anhydrous magnesium sulfate and chromatographed on 500 g. of silica gel. The column was eluted with ether-methylene dichloride-pentane 4:1:5, and the product (5.36 g.) was recrystallized from methanol to give 3α,1α-epoxymethano-5α-pregnan-20-one, M.P. 155.0–156.8° C. (corr.), $[\alpha]_D^{25} = +63.8°$ (1% in chloroform); infrared absorption at 3.46, 3.54, 5.90, 6.05, 6.15 and 6.20μ.

The 20-oxime of 3α,1α-epoxymethano-5α-pregnan-20-one was prepared by refluxing for two hours a mixture of 0.50 g. of 3α,1α-epoxymethano-5α-pregnan-20-one, 0.50 g. of hydroxylamine hydrochloride, 20 ml. of ethanol and 5 ml. of pyridine. The product was isolated by concentrating the mixture in vacuo and recrystallizing the residue from methanol to give the oxime, M.P. 199–202° C. (uncorr.); infrared absorption at 3.07, 3.45, 6.08, 6.12, 6.78 and 6.92μ. The formation of a mono-oxime constituted proof of the presence of ony one carbonyl group.

Example 19.—1α-acetyl-5α-pregnane-3,20-dione [X; lower-alkyl is CH₃, X is O, X' is (α-H)(β-COCH₃), 5α-series]

A solution of 4.29 g. of the 3,20-bis-ethylene glycol ketal of 1α-cyano-5α-pregnane-3,20-dione (Example 11) in 150 ml. of tetrahydrofuran was added during fifteen minutes to 33.3 ml. of 3 N methylmagnesium bromide in anhydrous ether, and the reaction mixture was heated at reflux for three and one-half days. The reaction mixture was cooled in an ice bath, 15 ml. of saturated ammonium chloride solution was added, and the mixture was filtered and concentrated in vacuo. Acetic acid (80 ml.) and 20 ml. of water were added to the residue and the mixture again concentrated in vacuo. Water (500 ml.) was added to the residue, and the solid product was collected and chromatographed on 500 g. of silica gel. The column was eluted with ether-methylene dichloride-pentane 3:1:6 followed by mixtures containing increasing amounts of ether and decreasing amounts of pentane. The eluant of proportion 6:1:3 brought out the desired product which was recrystallized once from 95% ethanol and three times from methyl ethyl ketone to give 1α-acetyl-5α-pregnane-3,20-dione, M.P. 218.8–221.8° C. (corr.), $[\alpha]_D^{25} = +212.7°$ (1% in chloroform); infrared absorption at 3.44, 5.84, 6.90, 7.05, 7.19 and 7.36μ.

By replacing the methylmagnesium bromide in the foregoing preparation by a molar equivalent amount of ethylmagnesium bromide, butylmagnesium bromide or hexylmagnesium bromide, there can be obtained, respectively, 1α-propionyl-5α-pregnane-3,20-dione, 1α-valeryl-5α-pregnane-3,20-dione or 1α-heptanoyl-5α-pregnane-3,20-dione.

Similarly, by replacing the 3,20-bis-ethylene glycol ketal of 1α-cyano-5α-pregnane-3,20-dione in the foregoing preparation by a molar equivalent amount of the 3,17-bis-ethylene glycol ketal of 1α-cyano-5β-androstane-3,17-dione (Example 6), the 3-ethylene glycol ketal of 1α-cyano-17α-methyl-5α-androstan-17β-ol - 3 - one (Example 10), or 1α-cyano - 5β - androstane-3α,17β-diol (Example 13), there can be obtained, respectively, 1α-acetyl-5β-androstane-3,17-dione [X; lower-alkyl is CH₃, X and X' are O, 5β-series], 1α-acetyl-17α-methyl-5α-androstan-17β-ol-3-one [X; lower-alkyl is CH₃, X is O, X' is (α-CH₃)(β-OH), 5α-series], or 1α-acetyl-5β-androstane-3α,17β-diol [X; lower-alkyl is CH₃, X is (H)(α-OH), X' is (α-H)(β-OH), 5β-series].

I claim:

1. A compound selected from the group consisting of (A) a compound of the formula

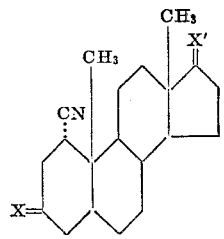

wherein X is a member of the group consisting of O, (H)(OH), and (H)(OAcyl); and X' is a member of the group consisting of O, (α-H)(β-OH), (α-H)(β-OAcyl), (α-lower-alkyl)(β-OH), (α-H)(β-COCH₃), and (α-H)(β-CH(OH)CH₃); Acyl being a carboxylic acyl group of from one to about ten carbon atoms and having a molecular weight less than about 200; and (B) a compound of the above formula having two double bonds, one in the 4,5-position and the other in the 6,7-position, X being O.

2. 1α-cyano-4,6-androstadien-17β-ol-3-one 17-acetate.
3. 1α-cyano-4,6-androstadien-17β-ol-3-one.
4. 1α-cyano-4,6-androstadiene-3,17-dione.
5. 1α-cyano-5β-androstan-17β-ol-3-one 17-acetate.
6. 1α - cyano - 4-bromo-5β-androstan-17β-ol-3-one 17-acetate.
7. 1α-cyano-5β-androstane-3,17-dione.
8. 1α-cyano-5α-androstan-17β-ol-3-one 17-acetate.
9. 1α-cyano-5α-2-androstene-3,17β-diol 3,17-diacetate.
10. 1-cyano-5α-1-androsten-17β-ol-3-one 17-acetate.
11. 1β-cyano-5α-androstan-17β-ol-3-one 17-acetate.
12. 1α-cyano-17α-methyl-5α-androstan-17β-ol-3-one.
13. 1α - cyano - 17α-methyl-5α-androstan-17β-ol-3-one 3-oxime.
14. 1α-cyano-5α-pregnane-3,20-dione.
15. 1α-cyano-5β-androstane-3α,17β-diol 17-acetate.
16. 1α-cyano-5α-androstane-3α,17β-diol 3,17-diacetate.
17. 1α-cyano-5α-androstane-3β,17β-diol 3,17-diacetate.
18. A compound of the formula

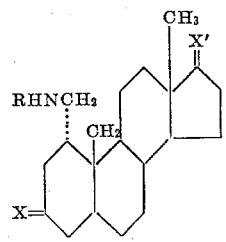

wherein X is a member of the group consisting of (H)(OH) and (H)(OAcyl); X' is a member of the group consisting of (α-H)(β-OH), (α-H)(β-OAcyl), (α-lower-alkyl)(β-OH), and (α-H)(β-CH(OH)CH₃); Acyl being a carboxylic acyl group of from one to about ten carbon atoms and having a molecular weight less than about 200; and R is a member of the group consisting of hydrogen and lower-alkanoyl.

19. 1α - formamidomethyl - 5β-androstane-3α,17β-diol 3-formate 17-acetate.
20. 1α-aminomethyl-5β-androstane-3α,17β - diol 3,17-diacetate.
21. 1α-aminomethyl-5α-androstane-3α,17β - diol 3,17-diacetate.
22. 1α-aminomethyl-5α-pregnane-3α,20-diol.
23. A compound of the formula

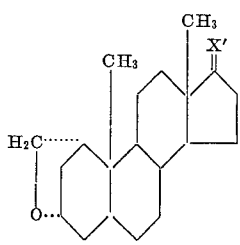

wherein X' is a member of the group consisting of O, (α-H)(β-OH), (α-H)(β-OAcyl), (α-lower-alkyl)(β-OH), (α-H)(β-COCH₃), and (α-H)(β-CH(OH)CH₃); Acyl being a carboxylic acyl group of from one to about ten carbon atoms and having a molecular weight less than about 200.

24. 3α,1α-epoxymethano-5α-androstan-17β-ol 17 - acetate.
25. 3α,1α-epoxymethano-5α-androstan-17β-ol.
26. 3α,1α-epoxymethano-5α-pregnan-20-one.
27. The process for preparing a 3α,1α-epoxymethano steroid which comprises treating with nitrous acid a compound of the formula

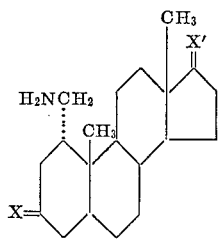

wherein X is a member of the group consisting of (H)(α-OH) and (H)(α-OAcyl); and X' is a member of the group consisting of (α-H)(β-OH), (α-H)(β-OAcyl), (α - lower - alkyl)(β - OH) and (α-H)(β-CH(OH)CH₃); Acyl being a carboxylic acyl group of from one to about ten carbon atoms and having a molecular weight less than about 200.

28. A compound of the formula

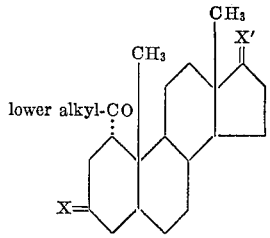

wherein X is a member of the group consisting of O, (H)(OH), and (H)(OAcyl); and X' is a member of the group consisting of O, (α-H)(β-OH), (α-H)(β-OAcyl), (α-lower-alkyl)(β-OH), (α-H)(β-COCH₃), and (α-H)(β-CH(OH)CH₃); Acyl being a carboxylic acyl group of from one to about ten carbon atoms and having a molecular weight less than about 200.

29. 1α-acetyl-5α-pregnane-3,20-dione.
30. A compound of the following formula

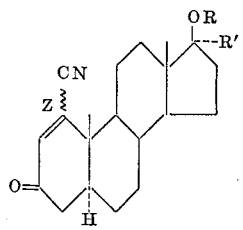

wherein R is selected from the group consisting of hydrogen and a hydrocarbon carboxylic acyl group of less than 12 carbon atoms, R' is a member of the group consisting of hydrogen and lower alkyl and Z is selected from the group consisting of a double bond and a saturated linkage.

References Cited

UNITED STATES PATENTS 3,054,809   9/1962   Bowers et al. _____ 260—397.3
3,088,952   5/1963   Bowers et al. _____ 260—397.3

LEWIS COTTS, *Primary Examiner.*

H. A. FRENCH, *Assistant Examiner.*

UNITED STATES PATENT OFFICE
CERTIFICATE OF CORRECTION

Patent No. 3,377,341

April 9, 1968

Robert G. Christiansen

It is hereby certified that error appears in the above numbered patent requiring correction and that the said Letters Patent should read as corrected below.

Column 3, lines 11 to 18, the right-hand portion of the formula should appear as shown below:

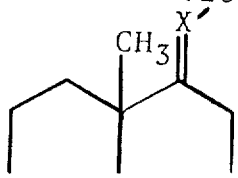

lines 46 to 50, the left-hand portion of the formula should appear as shown below:

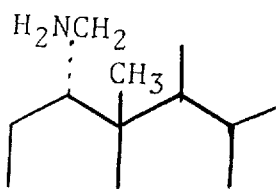

Column 7, line 62 "androstan" should read -- androsten --. Column 10, line 10, "260.4° C." should read -- 206.4° C. --; line 33, "5α-series" should read -- 5β-series --; line 61, $[\alpha]_D^{25} +=34.3°$ should read $[\alpha]_D^{25} =-34.3°$ Column 11, line 4 "-5-" should read -- -5α- --; line 11, "aminoethyl" should read -- aminomethyl --; line 25, "cyclohexane" should read -- cyclohexanone --. Column 12, lines 69 to 73, the left-hand portion of the formula should appear as shown below:

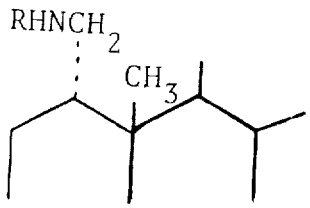

Column 14, lines 29 to 35, the left-hand portion of the formula should appear as shown below:

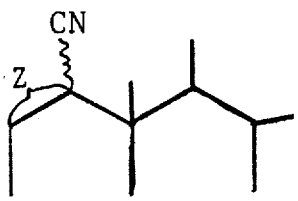

Signed and sealed this 16th day of September 1969.

(SEAL)
Attest:

EDWARD M. FLETCHER, JR.
Attesting Officer

WILLIAM E. SCHUYLER, JR.
Commissioner of Patents